United States Patent [19]
Okamoto

[11] 3,784,717
[45] Jan. 8, 1974

[54] GROUP TEACHING SYSTEM FOR MUSICAL INSTRUMENTS INCORPORATED WITH INFORMATION EXCHANGING ARRANGEMENT BETWEEN A TEACHER STATION AND A PLURALITY OF STUDENT STATIONS

[75] Inventor: Eisaku Okamoto, Hamakita, Japan

[73] Assignee: Nippon Gakki Seizo Kabushiki Kaisha, Hamamatsu-shi, Shizuoka-ken, Japan

[22] Filed: Mar. 13, 1973

[21] Appl. No.: 340,656

[30] Foreign Application Priority Data
Mar. 14, 1972  Japan.............................. 47-25889

[52] U.S. Cl. .................................. 84/470, 179/1 B
[51] Int. Cl. ............................................ G09b 15/00
[58] Field of Search............................ 84/470, 478; 179/1 B; 35/35 R, 35 C, 5, 6, 8 R

[56] References Cited
UNITED STATES PATENTS

| | | | |
|---|---|---|---|
| 3,184,549 | 5/1965 | Auernheimer | 84/470 UX |
| 3,470,785 | 10/1969 | Shallenberger et al. | 84/470 |
| 3,475,833 | 11/1969 | Andersen | 84/470 |
| 3,541,915 | 11/1970 | Rhodes | 84/470 |
| 3,584,530 | 6/1971 | Andersen | 84/470 |
| 3,595,120 | 7/1971 | Martin et al. | 84/470 |

*Primary Examiner*—Richard B. Wilkinson
*Assistant Examiner*—John F. Gonzales
*Attorney*—Robert D. Flynn et al.

[57] ABSTRACT

A group teaching system for musical instruments includes with an information-exchange circuit arrangement provided between a teacher station and a plurality of student stations. The teacher station comprises a clock pulse generator, a ring counter for generating the same number of sequential pulses as the student stations upon receipt of clock pulses from said generator and a switch assembly for selectively supplying as selection pulses one or more pulses from the ring counter to the student stations. Each student station comprises a ring counter and a circuit for detecting the corresponding selection pulse in synchronization with a clock pulse from the clock pulse generator, the detected selection pulse being used in producing a gating signal. The student station, further has gate circuits or switches included in the information-exchange circuit arrangement so as to establish a communication path between the teacher station and one or more selected student stations in response to the gating signal, thereby permitting information exchange therebetween.

4 Claims, 4 Drawing Figures

GROUP TEACHING SYSTEM FOR MUSICAL INSTRUMENTS INCORPORATED WITH INFORMATION EXCHANGING ARRANGEMENT BETWEEN A TEACHER STATION AND A PLURALITY OF STUDENT STATIONS

BACKGROUND OF THE INVENTION

This invention relates to a group teaching system for musical instruments and more particularly to a mass teaching system for musical instruments which is provided with a circuit arrangement for effecting conversation and exchanging information on the played sounds between the teacher station and the selected student station.

Recently, there has been developed a group teaching system for electronic musical instruments which comprises a teacher station and a plurality of student stations. Since an electronic musical instrument is operated by electric signals, sounds played thereon can be heard through a head-phone. Accordingly, even when numerous students play musical instruments at the same time, each of them can concentrate on practice without being obstructed by the play of the other student. Further, the group teaching system enables speech sounds and instrument sounds to be exchanged between the teacher and the selected students through an information-exchange circuit arrangement, thereby enabling the teacher to give personal instructions to the student. In this case, the teacher station and a plurality of student stations have to be provided with separate information-exchange circuits so as to transmit speech sound signals and instrument sound signals from the teacher to the selected student or backwards. One of the information-exchange circuits of the teacher station is selectively actuated by a student station-selecting switch assembly so as to connect the teacher station to the selected student station. The information-exchange circuits should each consist of two communication lines per student station so as to effect transmission of signals from the teacher to the selected student and vice versa. This arrangement requires a very large number of signal circuits to be gathered in the teacher station, rendering the entire teaching system uselessly complicated and difficult to handle.

If is accordingly an object of this invention to simplify the information-exchange circuit arrangement.

Another object of the invention is to provide a common circuit for controlling the selection of the student stations by the teacher station between the teacher station and the student stations in addition to the information-exchange circuits connecting both teacher and student stations, thereby decreasing the total number of required circuits.

SUMMARY OF THE INVENTION

According to this invention, the teacher station comprises a clock pulse generator, a ring counter for generating sequential pulses each corresponding to the respective student station in response to clock pulses from the clock pulse generator and a student station-selecting switch assembly operated by the teacher so as to transmit one or more selection pulses from the ring counter to the student stations. A selection pulse delivered from the selection switch assembly is conducted to the student stations through one line. Each student station is provided with, for example, a ring counter for receiving clock pulses and an AND circuit in order to detect only the assigned selection pulse from the teacher station. The ring counter of the student station is so designed as to produce an output from the assigned stage. When the ring counter produces an output and a selection pulse assigned to the selected student station comes from the teacher station simultaneously, the AND circuit in that student station delivers a selection pulse. Upon delivery of the output pulse from the AND circuit, there is generated a gating signal which actuates gating means disposed between the transmitter and receiver of the teacher station and those of the student station so as to establish a communication path between the teacher station and that particular student station thereby permitting conversation and information exchange therebetween.

DETAILED DESCRIPTION OF THE INVENTION

Figure 1:
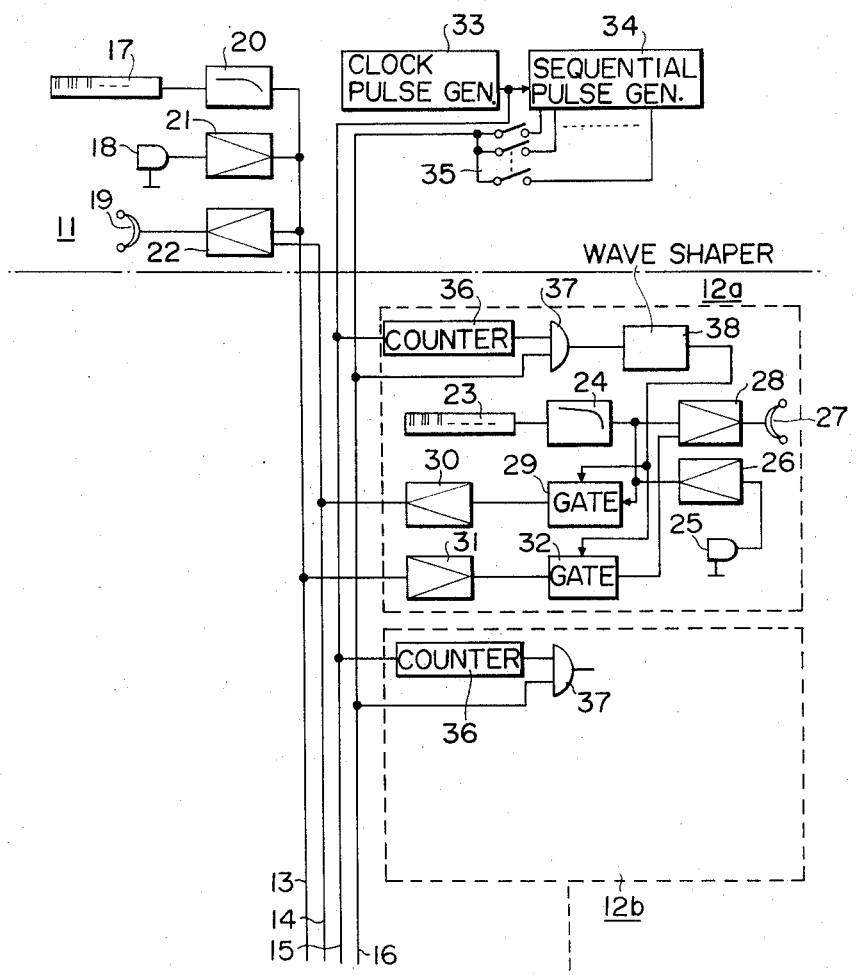
FIG. 1 shows a circuit arrangement of a group teaching system for musical instruments embodying this invention.

Referring to FIG. 1 there are provided a teacher station 11 and a plurality of student stations 12a, 12b . . . (only one of which is indicated in detail). The teacher station and student station are connected by an information-exchange circuit consisting of a teacher station signal line 13 and a student station signal line 14 as well as by a control circuit for selection of a student station consisting of a clock pulse line 15 and a student station-selecting pulse line 16.

The teacher station 11 is provided with an electronic musical instrument-playing section 17, a microphone or transmitter 18 and a headphone or receiver 19. Tone signals delivered by the playing section 17 are conducted to the teacher station signal line 13 through tone coloring filters 20, and outputs from the microphone 18 are supplied to the signal line 13 through an amplifier 21. The signal line 13 is connected to the headphone 19 through an amplifier 22.

The student station 12a (the following description also applies to the other student stations) comprises an electronic musical instrument-playing section 23, microphone 25 and headphone 27. Tone signals delivered by the playing section 23 are conducted to the headphone 27 through tone coloring filters 24 and an amplifier 28, and outputs from the microphone 25 are supplied to an amplifier 26. Outputs from the tone coloring filters 24 and amplifier 26 are supplied to the student station signal line 14 through a gate circuit 29 and amplifier 30, the signal line 14 being connected to the input of the amplifier 22 in the teacher station 11. On the other hand, the signal line 13 from the teacher station 11 is connected to the input of an amplifier 28 through an amplifier 31 and a gate circuit 32.

The teacher station 11 is further provided with a clock pulse generator 33 and a sequential pulse generator 34, which may consist of, for example a ring counter capable of generating an n number of sequential pulses corresponding to an n number of student stations in response to clock pulses from the clock pulse generator 33. Outputs from the clock pulse generator 33 are conducted to the clock pulse line 15, and outputs from the sequential pulse generator 34 are individually supplied to the student station selecting pulse line 16 selectively through the one or more of an n number of student station-selecting switches 35 operated by the teacher when he desires to talk with the selected student.

The student station 12a is provided with a counter 36 which may consist of a ring counter bearing an n number of stages to receive the clock pulse through the clock pulse line 15 and starting the counting from numeral 1.

An output from the first stage of the ring counter 36 of the first student station 12a is supplied to an AND circuit 37 together with a selection pulse delivered from the teacher station 11 through the selecting switch 35 assigned with number 1 and the student station-selecting pulse line 16. An output pulse from the AND circuit 37 is conducted to a wave shaper 38 which produces a gating signal for actuating the gate circuits 29 and 32. The ring counter 36 of the second student station 12b delivers an output signal from its second stage.

Figure 3:
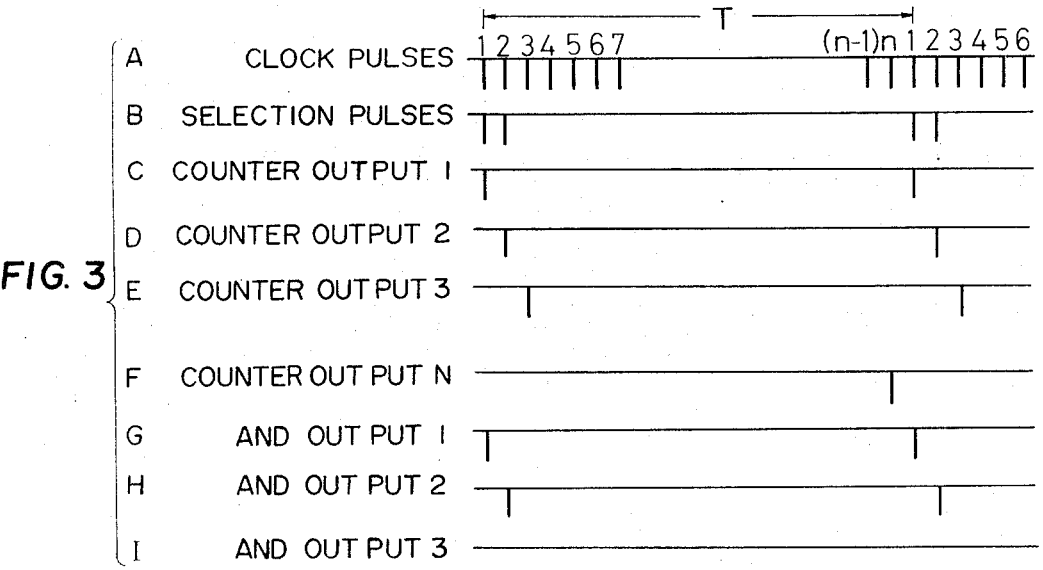
FIGS. 3 and 4 indicate wave forms by way of illustrating the operation of the group teaching system of the invention.
Figure 4:
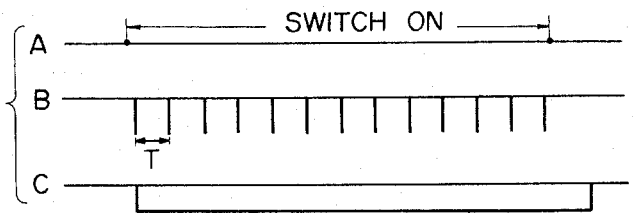

There will now be described by reference to FIGS. 3 and 4 the operation of a group teaching system for musical instruments according to this invention shown in FIG. 1. The sequential pulse generator 34 and all of the counters 36 start their counting from number 1 upon closure of the instrument power switch and always count the same number synchronously. Where the first and second switch of the student station-selecting switch assembly 35 is thrown in to pickup the first and second student stations 12a and 12b, student station-selecting pulses consisting of number 1 pulse and number 2 pulse as shown in FIG. 3B are supplied to the line 16 in synchronization with an output pulse (FIG. 3A) from the clock pulse generator 33. Upon receipt of the clock pulses of FIG. 3A, the counters 36 in the first, second, third through n-th student stations deliver output pulses shown in FIGS. 3C, 3D, 3E . . . 3F respectively. Upon receipt of the student station selecting pulses of FIG. 3B and output pulses of FIGS. 3C and 3D from the ring counters 36, the AND circuits 37 in the first and second student stations 12a and 12b give forth outputs shown in FIGS. 3G and 3H respectively. The AND circuit of the third student station produces no output as seen from FIG. 3I. This holds true with the fourth and succeeding other student stations.

Thus the AND circuits 37 in the first and second student stations 12a and 12b produce output pulses shown in FIG. 4B during the period in which the switch of FIG. 4A is thrown in, namely, during the period in which the teacher desires to converse with the students at said first and second stations. The shaper 38 generates a continuous gating signal shown in FIG. 4C in response to the output pulse from said AND circuit 37, thereby actuating the gate circuits 29 and 32 of the student stations 12a and 12b. Accordingly, the information exchange circuit or the communication path between the teacher station and student stations 12a and 12b is established.

Figure 2:
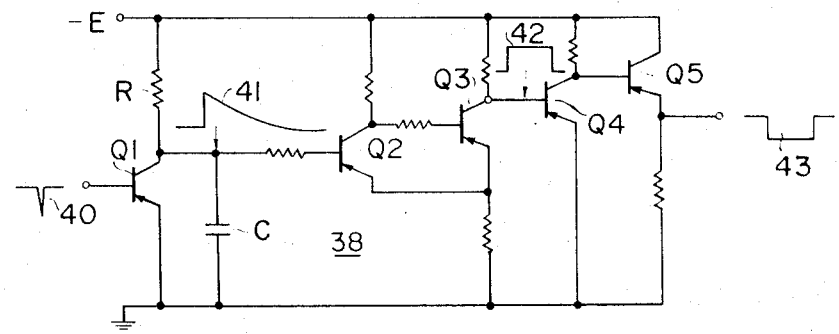
FIG. 2 shows a circuit of a wave shaper used in FIG. 1.

There will now be described by reference to FIG. 2 the embodiment of a wave shaper for generating the gating signal of FIG. 4C in response to the pulse of FIG. 4B.

An input pulse 40 is shaped into the indicated output pulse 41 by a circuit including a transistor Q1, resistor R and capacitor C. The output pulse 41 is again shaped into the indicated rectangular pulse 42 by a Schmitt circuit including transistors Q2 and Q3. The rectangular pulse 42 has its polarity reversed by a transistor Q4 to deliver an output pulse 43 through an emitter follower transistor Q5 for impedance conversion. Where, in the way shaper of FIG. 2, the time constant defined by the resistor R and capacitor C and the threshold level of the Schmitt circuit is so set as to cause the rectangular pulse to continue slightly longer than the period T of an input pulse, then the pulse of FIG. 4B supplied to the shaper will be delivered out, as easily understood, in the form of a continuous step voltage shown in FIG. 4C.

What is claimed is:

1. A group teaching system for musical instrument including a teacher station, a plurality of student stations and a circuit for effecting exchange of information between said teacher station and said student stations, said teacher station comprises a clock pulse generator; sequential pulse generating means for generating sequential pulses each corresponding to the respective student station in synchronization with clock pulses from said clock pulse generator; and a student station-selecting switch assembly for selectively supplying one or more pulses from said sequential pulse generating means to said student stations, and each of said student stations comprises detecting means connected to receive clock pulses from said clock pulse generator and said one or more pulse from said sequential pulse generating means for detecting only the corresponding pulse supplied from said sequential pulse generating means; means for generating a gating signal in synchronization with an output from said detecting means; and gating means for establishing an information-exchange circuit between the teacher station and the student station in response to said gating signal.

2. A group teaching system for musical instruments including a teacher station and a plurality of student stations, said teacher station comprises a transmitter; a receiver; a clock pulse generator; sequential pulse generating means for generating sequential pulses each corresponding to the respective student station in synchronization with clock pulses from said clock pulse generator; and a student station-selecting switch assembly for selectively supplying one or more pulse from said sequential pulse generating means to said student stations, and each of said student station comprises a transmitter connected to said receiver of said teacher station; a reciver connected to said transmitter of said teacher station; detecting means for detecting only a corresponding pulse supplied from said sequential pulse generating means in synchronization with a clock pulse generated at the predetermined interval by said clock pulse generator; means for producing a gating signal in response to an output from said detecting means; and a first gating means connected between said transmitter of said teacher station and said receiver of said student station and a second gating means connected between said receiver of said teacher station and said transmitter of said student station for permitting exchange of information between said teacher station and said student station in response to said gating signal.

3. A group teaching system for musical instruments including a teacher station and a plurality of student stations, said teacher station comprises a first electronic musical instrument-playing section; a first transmitter; a first receiver coupled to outputs of said electronic musical instrument-playing section; a clock pulse generator; sequential pulse generating means for generating sequential pulses each corresponding to the respective student station in synchronization with clock pulses from said clock pulse generator; and a student station-selecting switch assembly for selectively supplying one or more pulses from said sequential pulse generating means to said student stations, and each of said student stations comprises a second electronic musical instrument-playing section; a second transmitter; a second receiver coupled to outputs of said second electronic musical instrument-playing section; first gating means for coupling outputs of said second electronic musical instrument-playing section and second transmitter to ssaid first receiver of said teacher station; second gating means for coupling outputs of said first electronic musical instrument playing section and said first transmitter of said teacher station to said second receiver; detecting means connected to receive clock pulses from said clock pulse generator and said one or more pulses from said sequential pulse generating means through said student station-selecting switch assembly for detecting the corresponding pulse from said sequential pulse generating means; and means for producing a gating signal for enabling said first and second gating means in response to an output from said detecting means.

4. A group teaching system for musical instruments according to claim 3 wherein said sequential pulse generating means of said teacher station comprises a ring counter having an n number of stages; and said detecting means of student stations comprises a ring counter having the same n number of stages which produces an output from the predetermined one of said stages in response to said clock pulses and an AND circuit connected to receive an output from said predetermined stage of said ring counter and said one or more pulses delivered from said sequential pulse generating means through said student station-selecting switch assembly.

* * * * *